United States Patent [19]

Rieger et al.

[11] 4,134,776
[45] Jan. 16, 1979

[54] EXTERIOR GRADE TITANIUM DIOXIDE COATED MICA

[75] Inventors: Carl J. Rieger, Yorktown Heights; Louis Armanini, Pleasantville, both of N.Y.

[73] Assignee: The Mearl Corporation, Ossining, N.Y.

[21] Appl. No.: 864,744

[22] Filed: Dec. 27, 1977

[51] Int. Cl.² .................... C09C 1/00; C09C 1/34; C09C 1/36
[52] U.S. Cl. .................... 106/291; 106/300; 106/302; 106/308 B; 260/42.14
[58] Field of Search .................... 106/291, 300, 308 B, 106/302; 260/42.14

[56] References Cited

U.S. PATENT DOCUMENTS

| | | | |
|---|---|---|---|
| 3,087,828 | 4/1963 | Linton | 106/291 |
| 3,832,208 | 8/1974 | Jackson | 106/308 Q |
| 3,960,589 | 6/1976 | Morrison et al. | 106/300 |
| 4,022,632 | 5/1977 | Newland et al. | 106/300 |
| 4,038,099 | 7/1977 | DeLuca et al. | 106/291 |

OTHER PUBLICATIONS

Bonsack, J. P. – "Titanium Dioxide Pigment-Liquid-Liquid Extraction of Chromium"– Ind. Eng. Chem. Prod. Res. Develop, vol. 9 (3) (1970) pp. 398–403.

*Primary Examiner*—Helen McCarthy
*Attorney, Agent, or Firm*—Ostrolenk, Faber, Gerb & Soffen

[57] ABSTRACT

This invention relates to a titanium dioxide coated mica platey pigment which displays high luster or reflectivity in a suitable coating on a smooth surface, and which has a high resistance to change in appearance when subjected to weatherability stress. The titanium dioxide must be in the rutile crystal structure, the calcining of the titanium dioxide coated mica product must be carried out under rather extended time-temperature conditions, and the product requires a post-treatment with chromium III hydroxide.

10 Claims, No Drawings

EXTERIOR GRADE TITANIUM DIOXIDE COATED MICA

BACKGROUND OF THE INVENTION

The formulation of a coating particularly suitable for exterior metal surfaces such as for automobiles is complex. The coating must remain essentially unchanged in appearance over a period of several years while being exposed to a variety of weather conditions.

The two major components of the coating are the vehicle and the pigment. The vehicle can vary widely in stability properties. The pigment can also vary considerably in stability properties, and in some cases, there is some interaction between the pigment and the vehicle when subjected to actual weather conditions.

Titanium dioxide is a most important pigment in such coatings, and there is a large quantity of information available on methods and techniques to increase the stability properties of titanium dioxide. A good review of the literature on this subject is available in "Titanium, Its Occurrence, Chemistry, and Technology", Jelks Barksdale, Ronald Press, New York, Second Edition, 1966, pages 533–567.

However, titanium dioxide coated mica nacreous pigment is a more complicated entity than pigmentary titanium dioxide with respect to stability properties in a coating exposed to weather conditions. Thus, methods and techniques used to stabilize pigmentary titanium dioxide are either ineffective or insufficient to provide stability for titanium dioxide coated mica platelets because there are reactions that involve the mica-titanium dioxide interface as well as the titanium dioxide alone.

The major effort in the past for imparting stability to pigmentary titanium dioxide has been for coatings on exterior wood surfaces, known as trade sales paints. It has been well recognized that solar radiation in the near ultraviolet region was the major cause of film degradation. It is only in recent years that it has been recognized that the outdoor weathering of a film which leads to its deterioration is much more complicated than just its exposure to near ultraviolet light from the sun. Deterioration of a film coating is due to the combination of the near ultraviolet light from the sun, moisture, and heat. Each of these agents may have a different effect on the vehicle, on the pigment, or on both, and at the present time, it is not possible to clearly delineate the various mechanisms of the chemical and physical reactions which take place. Unquestionably, there are also many interactions.

The use of titanium dioxide coated mica platey pigments in coatings on metal for exterior purposes has been faced with two major obstacles. One was an incomplete recognition of the weather conditions that lead to film breakdown, and the other was inadequate treatment of the pigment to provide it with improved stability.

Of utmost importance is the recognition today that not only is the film affected by the several agents outlined above, but also the changes in these conditions can lead to the degradation of the coating film. This recognition is suitably described in the paper, "Correlation of Laboratory to Natural Weathering", by G. W. Grossman, Journal of Coatings Technology, Vol. 49, No. 633, pp. 45–54, Oct. 1977. Hereinafter, the effects of cyclic variations in near ultraviolet radiation, moisture, and temperature will be referred to as "weatherability stress".

The industry standard weatherability testing is to subject the coated metal panels to outdoor Florida weather for up to two years. The conditions there are most severe, since the daily cycle includes the night with lower temperature and high humidity, possibly some water condensation on the panels, change in intense sunlight in the morning along with substantial temperature increases, the possibility of liquid water on the panel from rain in the afternoon followed by sunlight again and decreasing humidity, and finally the night again with falling temperatures and increasing humidity.

Obviously, it would greatly facilitate the testing of pigments for weatherability stress by using simulated weather conditions in the laboratory. It has been found that this can be accomplished by using a laboratory instrument, the Q-U-V Cyclic Ultraviolet Weathering Tester, which provides cyclical weather conditions for coated metal panels so that in a 24 hour cycle, variations in near ultraviolet light, water spray, and temperature are presented to the panels. It has been found that after about one month exposure in the Q-U-V, various coated metal panel samples can be ranked in the same order as those exposed in outdoors southern Florida for two years.

It should be recognized that this type of testing is much more relevant and complete than much of the laboratory testing that has been carried out in the past. The Fade-Ometer testing is inadequate because only radiation exposure is involved. The Cleveland Humidity Cabinet is insufficient for this type of testing since the panels are subjected only to heat and moisture. Other instruments which present either moisture or ultraviolet radiation alone are inadequate for the same reasons. Further, the near ultraviolet radiation should present a substantial intensity in the wavelength region from 310–390 nm, and some ultraviolet light instruments have relatively poor intensities in this region. Finally, the near ultraviolet radiation, moisture, and temperature must be presented to the test panels on a cyclical basis, since the most severe aspect of this testing is that of the weatherability stress.

Although a great deal of work has been done in the past on modifying pigmentary titanium dioxide so as to improve its various stability properties, the testing has been done under single exposure conditions such as near ultraviolet radiation, heat, or moisture. Testing for each one of these conditions alone is inadequate in predicting the weatherability behavior of the coated panel. When titanium dioxide coated mica pigments are incorporated in the film, correlation between actual weatherability and any individual stability test just cited is poor.

Using the Q-U-V Cyclic Ultraviolet Weathering Tester for testing panels having coatings containing titanium dioxide coated mica, the ranking of resistance to change is excellent when compared to southern Florida outdoor exposure.

Well known or conventional titanium dioxide coated mica nacreous pigments, for example, those prepared according to Linton, U.S. Pat. No. 3,087,828, show very poor weatherability stress behavior when the pigment is incorporated in a suitable vehicle, coated on a metal panel, and subjected to testing in the Q-U-V. Conventional titanium dioxide coated mica nacreous pigments have received no special treatment to render them resistant to change under weatherability stress, and in addition, the titanium dioxide is in the anatase crystal form.

Treating pigmentary titanium dioxide with chromium compounds in order to impart to them improved stability properties is known. For example New, Journal Oil and Colour Chemists' Association, 20, 352, 1937, showed the use of chromium oleate in paints pigmented with titanium dioxide to increase the stability of the film. Treating the pigment particles directly with the chromium compound before incorporation into the vehicle was also found to be effective. New, U.S. Pat. No. 2,242,320, used chromium naphthenate as a surface coating on TiO$_2$. Nelson, U.S. Pat. No. 2,346,322, used deposition on calcined titanium dioxide to improve resistance to chalking and discoloration, in a combination of 0.5% chromium as the oxide, 2.0% zirconium silicate, and 1.0% alumina were used. Schaumann, U.S. Pat. Nos. 2,226,142, and 2,062,137, added a chromium compound to titanium dioxide pigment before calcination, and Coffelt, 2,045,836, shows the precipitation of titanium dioxide in the presence of chromic acid to form a titanium dioxide pigment containing chromate ion. Dawson, 2,232,168, provides for the coating of calcined titanium dioxide with small amounts of hydrous oxides of aluminum (0.25–2% as Al$_2$O$_3$) and chromium (0.01–0.2% as Cr$_2$O$_3$) followed by drying.

There is one example in the prior art of titanium dioxide coated mica receiving a chromium III compound treatment for improved stability, that is Jackson, U.S. Pat. No. 3,832,208. In this patent, the chromium compound treatment is limited to only one specific compound, methacrylatochromic chloride, and the effectiveness of the treatment is attained only if this compound remains essentially unhydrolyzed. Also, the treatment is intended to impart good resistance to change in a film containing the pigment when it is exposed to humidity conditions only.

It is the object of this invention to provide an exterior grade TiO$_2$ coated mica nacreous pigment which displays high luster and has a high resistance to weatherability stress. This and other objects of the invention will become apparent to those skilled in the art from the following detailed description.

SUMMARY OF THE INVENTION

The invention relates to an exterior grade TiO$_2$ coated mica pearlescent pigment and its preparation. The pigment is achieved by preparing a rutile TiO$_2$ coated mica, calcining under extended temperature/time conditions and post-treating the calcined pigment to obtain a chromium III hydroxide coating thereon.

DETAILED DESCRIPTION

The exterior grade nacreous pigment of this invention is realized by preparing a rutile TiO$_2$ coated mica which is calcined under extended temperature/time conditions and given a chromium III hydroxide post-coating.

The rutile form is essential but alone is not sufficient. Calcining conditions to attain the rutile crystal structure, or the maximum calcining conditions normally used for titanium dioxide coated mica in which the titanium dioxide is in the anatase crystal form, are also insufficient. The calcination must be carried out under extended temperature/time conditions, which are not normally used. The combination of these two factors are not sufficient for good resistance to weatherability stress, and the product requires a post-treatment with a chromium III compound to give it a chromium III hydroxide coating. Titanium dioxide coated mica nacreous pigments which additionally have the titanium dioxide in the rutile crystal form, have been subjected to extended temperature/time calcining conditions, and have a chromium III hydroxide post-coating show good resistance to weatherability stress.

The product of this invention differs from products in the literature referred to above in two important respects. The first is that the present invention deals with titanium dioxide coated mica nacreous pigments, and this more complex pigment introduces further factors into the instability characteristics of the pigment. It is well known to those familiar with this type of pigment that one type of degradation or change of the pigment in a coating involves the interface of the titanium dioxide and the mica. Of course, no such problem exists with pigmentary titanium dioxide. Further, tin oxide must be present in the titanium dioxide coated mica product in order for the titanium dioxide to be in the rutile modification, while tin oxide is not a needed component in pigmentary titanium dioxide in the rutile form. Since there are differences in the chemistry between SnO$_2$ and TiO$_2$, the rutile coated mica can show different chemical reactivity and stability from pigmentary rutile.

The second important difference is that the product of this invention shows resistance to change under weatherability stress, and prior art with treated pigmentary titanium dioxide has not been directed to this characteristic.

It is recognized that both the composition of the product of this invention and the test method are complex. The pigment includes at least four parts or processes which are essential to both a high luster nacreous pigment and good resistance to weatherability stress. These include mica, titanium dioxide coating on the mica in the rutile crystal form, extended calcining of the product, and post-coating with chromium III hydroxide. The test method of the metal panel with a coating containing this pigment includes near ultraviolet radiation, moisture, and heat, and all of these are presented in an alternating and cyclic fashion. Although mechanisms have been proposed for the individual chemical and physical reactions which may take place, there is no doubt that interactions must also take place. For example, reaction of the titanium dioxide due to the near ultraviolet radiation, which may lead to chalking, may be accelerated by the moisture conditions. Therefore, it is not possible to isolate specific factors in the pigment structure or processing and relate them to single causative factors in the weatherability stress conditions.

Mica platelets used in this invention are usually 1–75 microns in length, preferably 5–40 microns, and 0.03 to 3.0 microns in thickness, preferably 0.10–1.0 microns. The surface area of these mica platelets as measured by the BET method is about 1–10 meters$^2$/gram, preferably about 2–6 meters$^2$/gram.

The preparation of TiO$_2$ coated mica pearlescent pigments having the TiO$_2$ in the rutile crystalline form is described in De Luca et al, U.S. 4,038,099, which is hereby incorporated by reference. The initial coating on the mica must be from a tin compound in order to be assured of the rutile crystal form in the final calcined product, and this is most conveniently done by treating the aqueous slurry of the mica with a solution of stannic chloride or stannic sulfate. In general, the concentration of mica in this slurry can lie in the range of 1–25% by weight, preferably 5–15%. The treatment with the tin compound is described in De Luca et al U.S. Pat. No.

4,038,099, which is hereby incorporated by reference herein.

The titanium dioxide coating can be achieved by adding an acidic titanyl sulfate solution to the aqueous slurry of mica, which had previously been treated with a tin compound. The titanyl sulfate solution usually has a concentration of 2–12% expressed as $TiO_2$, with the preferred range being 3.0–6.0%, and also contains 10–30% sulfuric acid. The system can be heated to 70–110° C. to effect hydrolysis of the titanyl sulfate, and this leads to the coating of the mica platelets with hydrated amorphous titanium hydroxide. The coated mica platelets can then be separated from the reaction solution by filtration, washed with distilled water and dried in an oven at 80–130° C. for 1–6 hours. The $TiO_2$ coating can also be effected from a solution of $TiCl_4$ or other soluble titanium compound or complex. In general, the $TiO_2$ after calcining has a thickness of 20–350 millimicrons.

The calcining to convert from the hydrous oxide to a crystalline form must be done at elevated temperatures for extended times in order to obtain a maximum of weatherability protection. The calcination must be equivalent to at least 950° C. for 30 minutes. The actual temperature can be from 900° C. up to about 1000° C. or greater and the time can be greater or less than 0.5 hour. The higher the temperature, the less time is needed to realize the minimum amount of calcination. For example, calcining at 900° C. for 90 minutes, 925° C. for 50 minutes, 950° C. for 30 minutes, and 1000° C. for 15 minutes are substantially equivalent.

The chromium III hydroxide post-treatment of the calcined pigment is carried out by hydrolyzing a dilute solution of a soluble chromium III salt such as the chloride or sulfate to coat the platelets with a thin layer of chromium III hydroxide. The solution can contain about 0.5% to 5.0% Cr, preferably about 1% to 2.5% Cr.

The post-treatment can be accomplished by slurrying the calcined product in water at ambient temperature at a suitable concentration, e.g., about 5–15% pigment, and adjusting the pH of the slurry to about 5.5–6.5 with an appropriate reagent such as dilute sulfuric acid. While stirring, a chromium III salt solution is added, preferably at a constant rate over about 0.1–2.0 hours, desirably about 0.25–0.75 hour, the pH of the slurry is maintained at about 6.0 by addition of suitable quantities of a base such as dilute NaOH. Sufficient chromium III solution is added to yield an equivalent of about 0.2–1.0%, preferably about 0.3% to 0.6%, as chromium based on the total weight of the pigment. After all the chromium III solution is added, the slurry can be filtered, washed with water, and dried for about 1–2 hours at about 90–120° C. No further calcining of this product is necessary.

The resulting exterior grade $TiO_2$ coated mica pigments can be incorporated into paints and other types of siccative coating by procedures well known in the art. The resulting coatings on metal, ceramic, brick, stone, plastic and the like perform satisfactorily under outdoor conditions. The pigments can also be incorporated into various plastics, as known in the art. Thus, the pigments can be suspended in or supported on any light-transmitting resinous medium.

In the examples which follow, the pigment was incorporated in a thermosetting acrylic resin and sprayed onto primed metal panels. These panels, after being baked to cure the system, were subjected to weatherability stresses in the Q-U-V Cyclic Ultraviolet Weathering Tester.

The tester is run on a 24 hour cycle during which the UV lamps are on for 4 hours with a temperature of about 65° C., followed by a water condensation cycle of 4 hours at a temperature of about 50° C. This cycle is repeated three times during a 24 hour period, thus subjecting these test panels to a simulated hot tropical day followed immediately by a warm humid night, during which moisture condenses on the panels. While the panels are still wet with the condensed moisture, they are subjected to intense UV light as the UV cycle is repeated. It is this combination of effects, i.e. intense UV light on wet surfaces at elevated temperatures, that has been found most damaging to most polymeric materials in coatings on metal panels.

Multiple panels of the same sample were exposed in the Q-U-V at the same time, and a panel was removed from the tester periodically and examined visually for any sign of change in appearance. Also a glossmeter was used to measure changes in gloss (at 20° and 60° gloss angles) of the exposed panel compared to their original gloss (before exposure). A convenient way to express this loss of gloss is to refer to the percentage of gloss remaining after a given number of exposure hours in the Q-U-V tester.

Convenient test periods are 168 hours (1 week), 336 hours (2 weeks), 504 hours (3 weeks), and 672 hours (4 weeks). After these exposure periods, rankings can be made with test panels of the same materials that were exposed to natural weathering conditions in south Florida. Excellent correlation has been found between the Q-U-V testing and the south Florida 2 year exposure, in that the rank of the change in appearance of the panels is in the same order (correlation ranking) for the Q-U-V as for the south Florida 2 year weathering.

Tests have shown that the chromium III hydroxide treated rutile coated mica samples of this invention outrank other pigments of the coated mica type which include rutile coated mica but without the chromium III hydroxide post-treatment. They far outrank conventional anatase coated micas. These rankings are based on the aforementioned visible changes in appearance and in the loss of gloss (readings in a glossmeter) due to weatherability stresses.

Some examples of this invention follow, but this invention is not limited to these particular sets of experimental conditions.

EXAMPLE 1

Anatase $TiO_2$ Coating on Mica

A pearl-reflecting titanium dioxide coated mica with the $TiO_2$ coating in the anatase crystal structure was prepared by coating suitable mica platelets with an acidic titanyl sulfate solution, and then subjecting the platelets to a high temperature calcination in order to convert the coating from a hydrous titanium dioxide to the crystalline anatase form.

Thus, 32 g. of mica platelets of dimensions described above were slurried in 118 ml. of water, and the slurry was heated to 70° C. At this temperature, 82 ml. of a filtered stock titanyl sulfate solution containing the equivalent of 10.0% $TiO_2$ and 26% $H_2SO_4$, were added over about 10 minutes. The slurry was then heated to reflux in about 45 minutes and kept at reflux for 60 minutes.

The slurry was filtered, washed with 2 liters of distilled water, and calcined at 950° C. for 30 minutes. After calcining, x-ray diffraction showed this product to be anatase $TiO_2$ on mica.

The sample was dispersed at about 3% in an acrylic thermosetting resin (Rohm & Haas AT-56 cross-linked by a melamine resin, Cymel 248-8), sprayed onto Bonderite-40 primed steel panels which were baked at about 120° C. for 20 minutes to cure the system, and then subjected to weathering stress in the Q-U-V tester for a total exposure time of 672 hours. As was discussed above, panels were sprayed in quadruplicate, and every 168 hours, a panel was removed from the test.

Visual observation showed change in appearance of the panel occurring as early as the first 168-hour exposure period. Some changes appear similar to the chalking effect. Also, losses in gloss were noted, the loss increasing with increasing exposure time in the Q-U-V tester until after the final exposure period of 672 hours (4 weeks), only about 20% of the original gloss remained. Final gloss readings are given in Table I.

EXAMPLE 2

Rutile $TiO_2$ Coating on Mica

A pearl-reflecting titanium dioxide coated mica with the $TiO_2$ coating in the rutile crystal structure was prepared by a procedure similar to that in Example 1 above, except that the mica was pre-treated with a tin compound, using a procedure similar to that of Example 1B of DeLuca et al, U.S. Pat. No. 4,038,099, in the following way. To 118 ml. distilled water are added 32 g. of mica platelets of the dimensions described before, and to this slurry at room temperature are added 8.0 ml. of 15% $SnCl_4$ solution. The latter is prepared by adding 20 g. of $SnCl_4.5H_2O$ solid to a solution consisting of 65 ml. of distilled water and 5 ml. of concentrated hydrochloric acid, followed by diluting to 100 ml. total volume with distilled water.

The slurry is heated to 70° C. in about 30 minutes and then 82 ml. of a filtered solution of titanyl sulfate solution are added. The latter contains the equivalent of 10% $TiO_2$ and 26% $H_2SO_4$. The slurry is then heated to reflux in about 45 minutes and is kept at reflux for an additional 60 minutes.

The slurry is then filtered, washed with distilled water, and calcined at 950° C. for 30 minutes. The calcined product showed an x-ray diffraction powder pattern to be that of rutile $TiO_2$ on mica.

Q-U-V testing was carried out as in Example 1. Weathering stress changes were observed but less pronounced than in Example 1. For example, only very slight changes in appearance occurred during the first 168 hours of exposure and more pronounced visual changes in appearance occurred, however, with longer exposures in the Q-U-V tester. Also, as can be seen in Table I, the percentage of gloss remaining after each exposure period, while an improvement over that in Example 1, was not nearly as good as those in Example 5 below.

EXAMPLE 3

Rutile $TiO_2$ Coating on Mica - Low Calcining Temperature and Time

A pearl-reflecting titanium dioxide coated mica with the $TiO_2$ coating in the rutile crystal structure was prepared in exactly the same manner as in Example 2. However, it was calcined for only 15 minutes at 900° C., as compared to 30 minutes at 950° C. for the product in Example 2.

This sample was sprayed onto metal panels in an acrylic system identical to that used in Example 2 and was tested in a similar manner in the Q-U-V tester. The changes in appearance of the coatings after exposure were nearly as much as those in Example 1, and some changes occurred in the first 168-hour test period in the Q-U-V tester.

The loss in gloss compared to the unexposed samples were also quite large. See Table 1 for comparison with other examples. These rather large changes that occurred with weathering stress make it apparent that just having the rutile structure of $TiO_2$ alone does not ensure weathering resistance.

EXAMPLE 4

Anatase $TiO_2$ Coating on Mica with Chromium III Hydroxide Post-Treatment

A pearl-reflecting titanium dioxide coated mica with the $TiO_2$ coating in the anatase crystal structure was prepared by a method similar to Example 1, except that after calcination at 950° C. for 30 minutes, it was given the following post-treatment to coat the platelets with chromium III hydroxide.

200 g. of the calcined material was slurried in 3400 ml. of distilled water, and the pH was adjusted to 6.0 using 2M $H_2SO_4$, added dropwise. Then 64 ml. of a 5% $CrCl_3$ solution were diluted with 200 ml. of distilled water, and this solution was added at a constant rate to the above slurry in approximately 30 minutes. The pH was maintained constant at 6.0 during this chromium III chloride addition by adding 10% sodium hydroxide solution as needed.

After all the chromium III chloride solution was added, the slurry was filtered, washed with water, and dried at 110°-120° C. for 1 hour. The anatase $TiO_2$ coated mica is now coated with a thin layer of chromium III hydroxide.

Again the samples were incorporated into the same acrylic vehicle as used in the above samples and were sprayed onto metal panels and tested in the Q-U-V tester. Visual changes were only slight in the first time exposure periods, i.e. 168 and 336 hours, but now definite chalking was noticed after 672 hours.

The amount of gloss lost was also considerably reduced over that lost in the product of Example 1, i.e. the anatase $TiO_2$ on mica but without the chromium III hydroxide treatment. The weatherability protection afforded the pigment by the chromium III hydroxide post-treatment can be seen by comparing the gloss loss between Example 1, and Example 4 in Table 1.

EXAMPLE 5

Rutile $TiO_2$ Coating on Mica with Chromium III Hydroxide Post-Treatment

A pearl-reflecting titanium dioxide coated mica with the $TiO_2$ coating in the rutile crystal structure was prepared in the same manner as in Example 2. It was calcined at 950° C. for 30 minutes, and then to further improve the weathering resistance, it was given the chromium III hydroxide post-treatment as in Example 4 above. This resulted in a rutile structure translucent titanium dioxide coated mica which has been well calcined and post-treated to provide a layer of chromium III hydroxide.

This product was subjected to testing in the Q-U-V tester in a thermosetting acrylic vehicle in a manner similar to the testing procedure above. Only very slight changes occurred even after the maximum test period of 672 hours in the Q-U-V tester. No chalking was seen, and only a faint color change could be detected.

Also, the amount of gloss retained at the completion of the weathering testing was nearly 85% of the original gloss, as compared to only 20% for the anatase coated mica of Example 1, and the final products listed in Table I.

whitening of the blue reflection color). The percentage change in gloss was also slight, with about 75% gloss remaining after the test period.

EXAMPLE 8

Polypropylene Color Chips of Rutile $TiO_2$ Coated Mica with Chromium III Hydroxide Treatment The pearl thickness rutile $TiO_2$ coated mica with the chromium III hydroxide treatment as prepared in Example 5 was incorporated at 1% pigment concentration into polypropylene by dry mixing 1 part of pigment Table I Variations in Weathering Stress Resistance of $TiO_2$ Coated Micas As a Function of Product Variables

| Examples No. | $TiO_2$ Structure | Calcining Temperature | Calcining Time, Min. | Chromium III Hydroxide Treatment | Color Change | Chalking | % Gloss Remaining (60° Gloss) |
|---|---|---|---|---|---|---|---|
| 1 | Anatase | 950° C | 30 | No | Great | Heavy | 20% |
| 2 | Rutile | 950° C | 30 | No | Moderate | Moderate | 50% |
| 3 | Rutile | 900° C | 15 | No | Great | Heavy | 35% |
| 4 | Anatase | 950° C | 30 | Yes | Slight-Moderate | Slight | 70% |
| 5 | Rutile | 950° C | 30 | Yes | Slight | None | 85% |

EXAMPLE 6

Rutile $TiO_2$ Coating on Mica with Chromium III Hydroxide Treatment and Gold Reflection Color The procedure is similar to that of Example 5 above, except that the amount of mica used was reduced to 15 g. This reduction in available surface area of mica, while keeping the titanyl sulfate concentration at the same levels as in the previous examples, produces a thicker coating of $TiO_2$ on the mica platelets. The reflection color obtained is now a red-orange after the reflux period, which after calcining at 950° for 30 minutes becomes a yellow-gold color.

This product was given the chromium III hydroxide post-treatment as in Example 4 and was subjected to Q-U-V testing as above.

After 672 hours in the Q-U-V tester, only a slight color change was noticed on the panel, and the percentage of gloss remaining (as compared to the original gloss) was nearly 80%.

EXAMPLE 7

Rulite $TiO_2$ Coating on Mica with Chromium III Hydroxide Treatment and Blue Reflection Color This procedure is similar to those of Examples 5 and 6 above, except that the amount of mica used is reduced to 7 g. This reduction in available surface area of mica, while keeping the titanyl sulfate concentration at the same levels as in Example 5, results in a thicker coating of $TiO_2$ on the mica platelets. The reflection color obtained was green after refluxing, and after calcining at 950° for 30 minutes, a bright blue reflection color was obtained.

This product was given the chromium III hydroxide post-treatment as in Example 4, and was subjected to Q-U-V testing as above. After 672 hours in the Q-U-V tester, only a slight color shift was noticed (a slight with 99 parts of polypropylene pellets and injection molding into pieces of color step-chips.

These chips were taped to 3 inches × 5 inches aluminum panels and were exposed in the Q-U-V tester along with control samples, which were made from products of Example 1 above.

The color chips made with the pigment described in Example 5 showed much less of a change in appearance than did the control step-chips, those made with the pigment of Example 1. This change in appearance with these polypropylene step-chips was greater than that exhibited by the sprayed metal panels, primarily because the polypropylene itself changes due to UV exposure. However, in all cases the pigment of this invention showed less change in the step-chips than the other pigments.

EXAMPLE 9

Two Year Outdoor Weathering Tests

Baked steel panels prepared as described in Examples 1, 2 and 5 (except that baking was for 30 minutes) were mounted on a test fence at 45° facing south in the Miami, Florida area. Multiple panels of each were simultaneously exposed and the top portion of each was masked to enable convenient comparison of the exposed and unexposed coatings. One panel of each was removed and examined. The data in the following Table II shows that the product of this invention gave the best results followed by rutile $TiO_2$ coated mica and lastly, anatase $TiO_2$ coated mica. Visual observation is in essential agreement with the 60° gloss reading results.

TABLE II

| | | Two Year Outdoor Weathering Test | | | | | | |
|---|---|---|---|---|---|---|---|---|
| Example Number | $TiO_2$ Structure | Chromium Treatment | Color Change | Chalking | % of 60° gloss remaining after-months | | | |
| | | | | | 6 | 12 | 18 | 24 |
| 1 | Anatase | No | Great | Heavy | 67 | 52 | 46 | 42 |
| 2 | Rutile | No | Moderate | Moderate | 76 | 62 | 58 | 54 |
| 5 | Rutile | Yes | Slight | None | 80 | 79 | 77 | 74 |

Various changes and modifications can be made without departing from the spirit and scope of this invention and all embodiments set forth herein were for illustration only. Throughout this specification and claims, all parts and percentages are by weight and all temperatures are in degrees centrigrade unless otherwise indicated.

What is claimed is:

1. A method of producing an exterior grade TiO$_2$ coated mica nacreous pigment which comprises (a) treating micaceous particles with a tin compound-containing solution (b) coating said particles with titanium dioxide in the amorphous form by deposition from a titanium compound-containing coating bath, (c) calcining said particles for a time and at a temperature at least equivalent to 950° C. for 30 minutes, and (d) coating the calcined particles with chromium III hydroxide by deposition from a chromium III compound-containing coating bath.

2. The method of claim 1 wherein said chromium III compound containing coating bath contains about 0.5-5.0% chromium.

3. The method of claim 2 wherein said chromium III compound-containing coating bath contains about 1-2.5% chromium.

4. The method of claim 1 wherein the amount of chromium coated is about 0.2-1.0% of the total weight of the pigment.

5. The method of claim 4 wherein the amount of chromium coated is about 0.3-0.6% of the total weight of the pigment.

6. An exterior grade TiO$_2$ coated mica nacreous pigment comprising micaceous particles having on the surfaces thereof a translucent coating of titanium dioxide in the rutile form which has been calcined for a time and temperature at least equivalent to 950° C. for 30 minutes, said translucent coating having a post-calcine coating of chromium III hydroxide thereon.

7. The pigment of claim 6 wherein said micaceous particles are mica flakes whose major dimensions are 1 to 75 microns and which have specific surface areas of about 1-10 m$^2$/g, and in which the rutile coating has a thickness of 20-350 millimicrons.

8. The pigment of claim 7 wherein chromium is about 0.2-1.0% of said pigment.

9. The pigment of claim 8 wherein said major dimensions are 5-40 microns and said surface area is about 2-6 m$^2$/g.

10. A nacreous composition comprising a light-transmitting resinous medium having suspended therein or supported thereon the nacreous pigment of claim 6.

* * * * *